United States Patent [19]

Valentino

[11] Patent Number: 5,132,622

[45] Date of Patent: Jul. 21, 1992

[54] METHOD AND APPARATUS FOR LOCATING AND RETRIEVING A GOLF BALL HAVING A METAL CENTER

[76] Inventor: Peter J. Valentino, 510 E. 27th St., Paterson, N.J. 07514

[21] Appl. No.: 641,181

[22] Filed: Jan. 15, 1991

[51] Int. Cl.⁵ .......................... G01V 3/08; G01V 3/10; A63B 43/00
[52] U.S. Cl. ...................................... 324/326; 273/213
[58] Field of Search ............................... 324/326–329; 276/213

[56] References Cited

U.S. PATENT DOCUMENTS 3,782,730  1/1974  Horchler .
4,359,686  11/1982  Wherry .
4,423,377  12/1983  Podhrasky .
4,660,039  4/1987  Barricks et al. .

Primary Examiner—Walter E. Snow

[57] ABSTRACT

A method for locating and retrieving a golf ball and an apparatus therefore is provided, the method of finding the golf ball involving the use of a metal detection means in connection with a golf ball having a metal center, the method for retrieving the golf ball involving the use of a retrieval scoop mounted on a telescopic arm extendible from the apparatus; the apparatus of the size and shape of a conventional golf club so that it may be conveniently placed within a golf bag and carried by a golfer along with the golfer's other golf clubs.

17 Claims, 4 Drawing Sheets

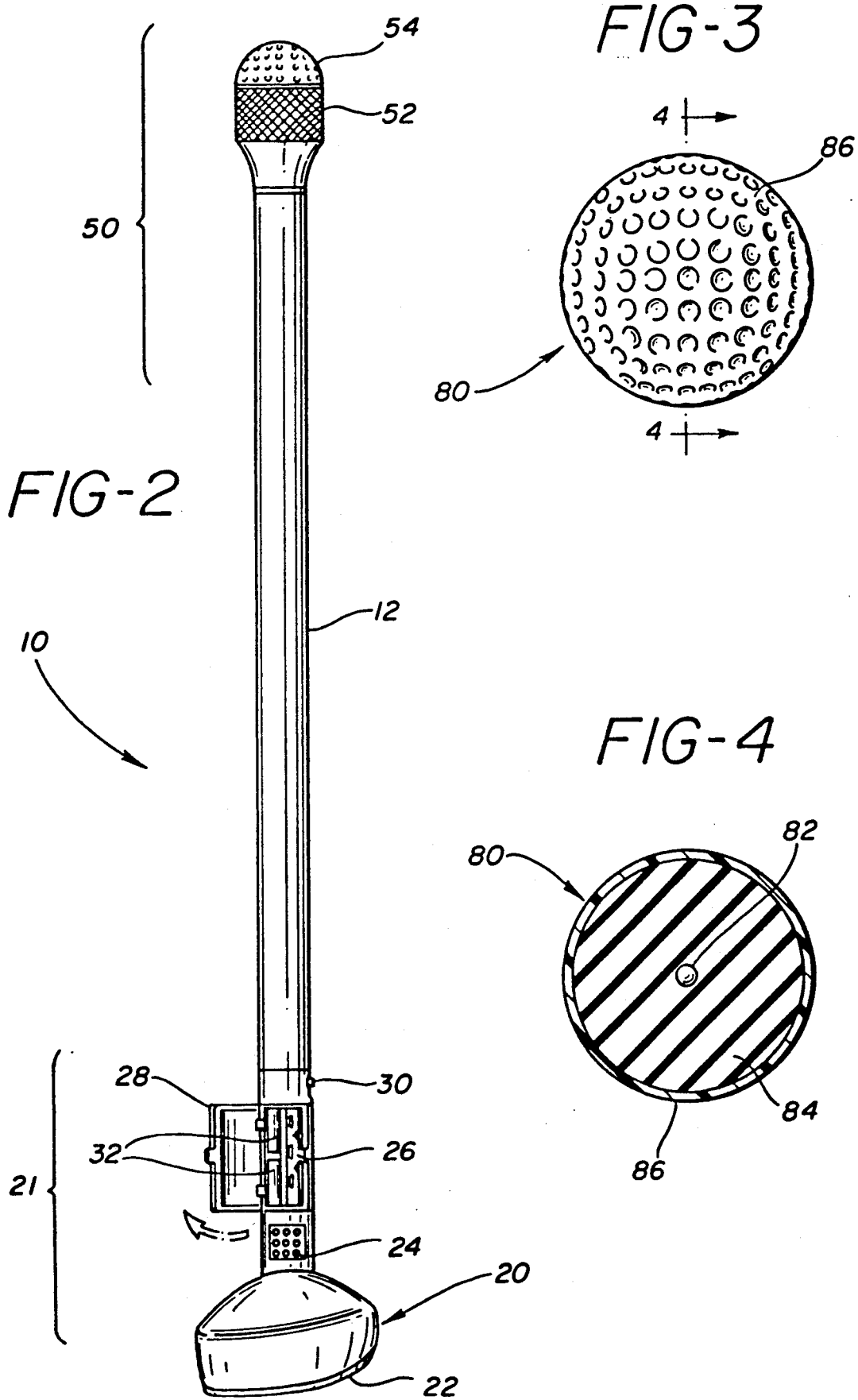

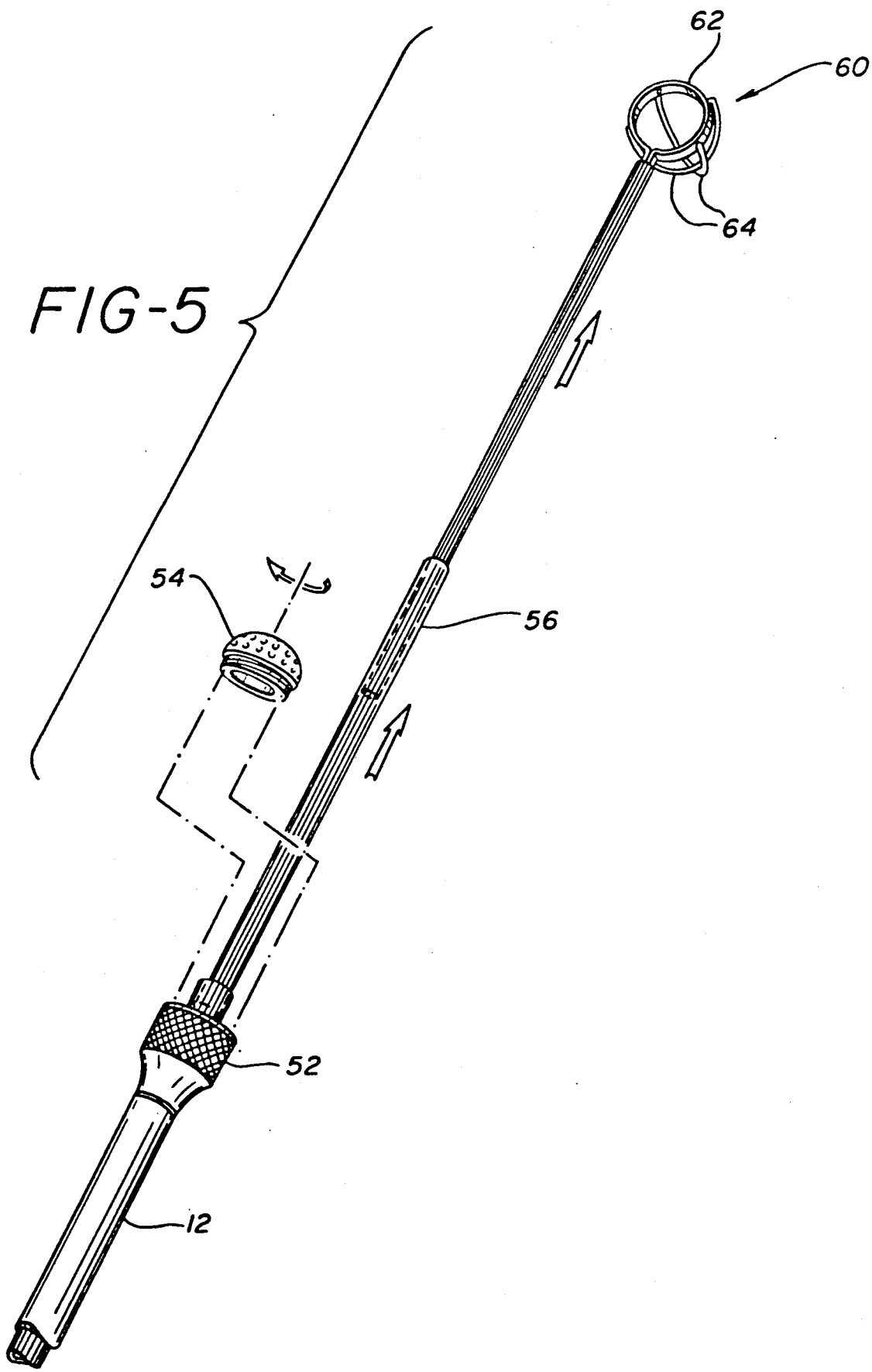

METHOD AND APPARATUS FOR LOCATING AND RETRIEVING A GOLF BALL HAVING A METAL CENTER

BACKGROUND OF THE INVENTION

1. Field of the Invention

This invention pertains in general to a method for locating and retrieving a golf ball and an apparatus therefore. More specifically, the invention provides a method and apparatus for locating and retrieving a golf ball having a metal center.

2. Related Art

This invention provides a method for locating and retrieving a golf ball having a metal center and an apparatus therefore. Efforts have been made to provide a system to locate golf balls, but none provide the ease and convenience of use of the present invention. Examples of such efforts are: U.S. Pat. No. 3,782,730; 4,359,686; 4,423,377; and 4,660,039. None of these patents, taken either singly or in combination, are thought to provide the benefits of the present invention.

U.S. Pat. No. 3,782,730 discloses a golf ball having an electronic signaling means in its center. The signaling means is an oscillator circuit. The signal is picked up by a radio receiver tuned to the proper frequency.

U.S. Pat. No. 4,359,686 discloses a metal detection apparatus having a basket at its end to facilitate recovery of metal objects, especially under water. This metal detection apparatus is unsuitable for use with a golf ball because the scoop is designed to be dug into the soil underlining water to recover metal objects imbedded within the soil whereas a golf ball would be located on top of the soil.

U.S. Pat. No. 4,423,377 discloses a compact metal detector of the bound induction type and of a planer assembly. It also has a low battery voltage indicator circuit. There is no disclosure relating to the retrieval of objects.

U.S. Pat. No. 4,660,039 discloses a system for locating a sports object, particularly a golf ball, wherein the object has its inductive strip on its outer surface and the user has a transmitter. In operation, the transmitter generates a signal, and when in the vicinity of the object with the conducting means, the load on the signal generating means is changed, causing an increased power output detectible by the transmitter.

SUMMARY OF THE INVENTION

Golf is a very popular sport—enjoyed by both professionals and amateurs. One of the problems encountered by golfers of all ability levels is lost golf balls. Lost golf balls are particularly troubling to golfers because not only do lost golf balls result in a penalty to the golfer's score, it is also financial loss. Further, time lost on fruitless searches for lost golf balls serve to frustrate both the golfer and his golfing companions.

This invention relates to a Method for Locating and Retrieving a Golf Ball and Apparatus Therefore. More specifically, this invention provides a method for locating a golf ball having a metallic element therein, a method for retrieving the golf ball after it is located, and an apparatus for use in location and retrieval of the golf ball.

The method of finding the golf ball involves the use of a metal detection means in connection with a golf ball having a metal center, while the method for retrieving the golf ball involves the use of a retrieval means, both the metal detection means and the retrieval means being formed as part of the golf ball finder apparatus.

The apparatus for use in locating and retrieving the golf ball is of a size and shape similar to a conventional golf club so that it may be conveniently placed within a golf bag and carried by a golfer along with the golfer's other golf clubs. The apparatus, like a golf club, includes a head portion, a shaft portion and a handle or grip portion. The detection means is disposed in the head of the apparatus. Mounted on the shaft is a speaker which emits an audible signal upon location of the golf ball. On the handle is a removable cap, removal of the which permits access to the retrieval means. The retrieval means comprises a scoop having collapsible scoop basket members mounted on a telescoping arm. The entire retrieval means is mounted within the shaft of the apparatus and is extendable out of the shaft for effecting retrieval.

The apparatus and method of this invention is useful for locating and retrieving golf balls that are lost because of any of a number of reasons including balls in submerged water traps, balls buried in sand traps and balls in wooded areas with underbrush, and even areas of rough where there may be the possibility of tick infestation which could cause Lyme disease.

Accordingly, it is an object of this invention to provide a method for the location and retrieval of a golf ball that can be easily and conveniently used by golfers.

It is also an object of this invention to provide an apparatus approximately the size of a golf club for locating and retrieving golf balls, so that the apparatus is able to fit into a golf bag.

It is still another object of this invention to provide a method of, and apparatus for, locating and retrieving a golf ball which is capable of locating and retrieving a golf ball that is submerged in water or buried in sand or deep in the rough.

Yet another object of this invention is to provide a method for locating and retrieving a high performance golf ball having a metal center.

It is a further object of this invention to provide an apparatus for locating and retrieving golf balls which has a joint means to allow for the attachment of other items to the apparatus, such as an umbrella.

It is still another object of the invention to provide an apparatus for locating and retrieving golf balls which is light in weight.

It is yet another object of this invention to provide an apparatus for locating and retrieving golf balls which is reliable and easy to use.

A further object of this invention is to provide an apparatus for locating and retrieving golf balls which can be carried along with golf clubs in a golf bag.

Still a further object of this invention is to provide an apparatus for locating and retrieving golf balls located on land or under water.

Yet even another object of this invention is to provide an apparatus for locating and retrieving golf balls which is battery operated and easy to use.

Still another object of this invention is to provide an apparatus for locating and retrieving golf balls which may be easily stored.

These, as well as further objects and advantages of this invention, will become apparent to those skilled in the art when they review the accompanying detailed description of the embodiment, reference being made to the accompanying drawings.

BRIEF DESCRIPTION OF THE DRAWINGS

FIG. 2 is a side view of the apparatus for locating retrieving golf balls with the cover for the power supply and PC board open.

FIG. 3 shows a golf ball having a metal center.

FIG. 4 is a view taken along line 4—4 of FIG. 3.

FIG. 5 is a fragmentary view of the apparatus for locating and retrieving a golf ball with the cap removed, the retriever shaft extended and the scoop basket members positioned for retrieval.

DETAILED DESCRIPTION OF THE PREFERRED EMBODIMENT

Figure 1:
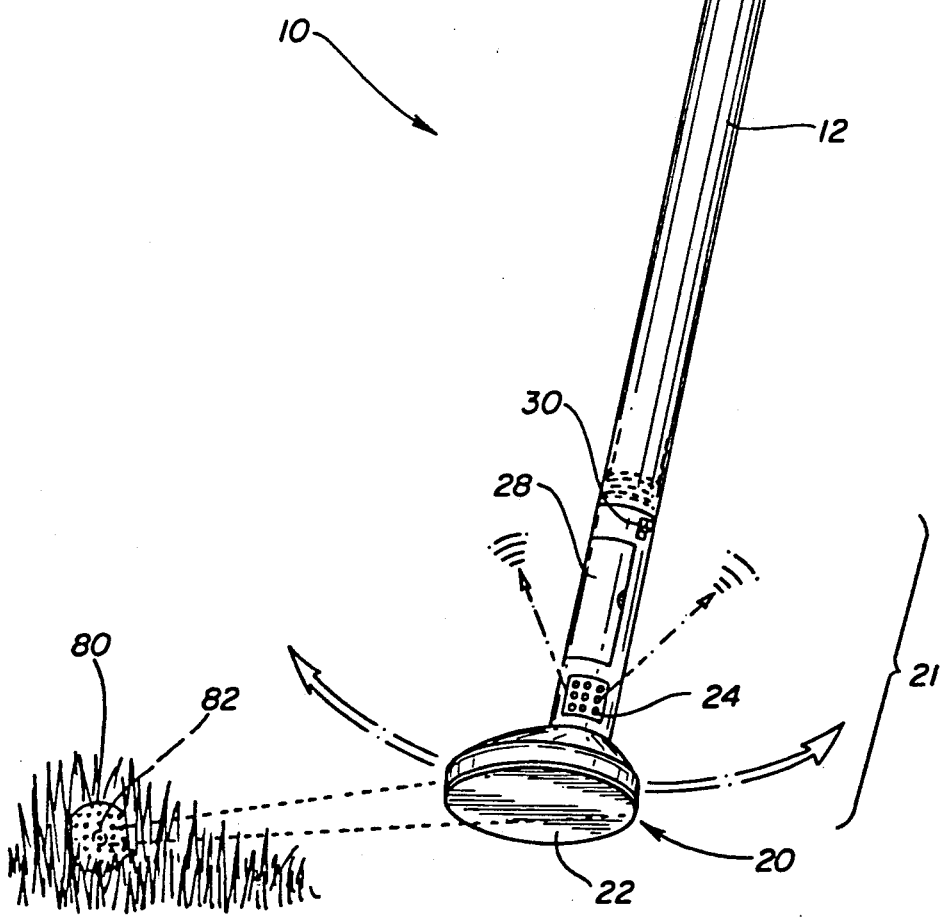
FIG. 1 depicts the apparatus for locating and retrieving golf balls being used for locating a golf ball.

Referring to FIGS. 1 and 2, the apparatus for locating and retrieving a golf ball, or the "golf ball finder" 10, is configured to generally resemble a golf club. As such, it comprises a head portion 21, a shaft portion 12 and a handle portion 50. The dimensions of the components are substantially similar to those of a conventional golf club to allow, among other things, the golf ball finder to be conveniently placed into a golf bag and carried by a golfer along with the golfer's other clubs.

Figure 6:
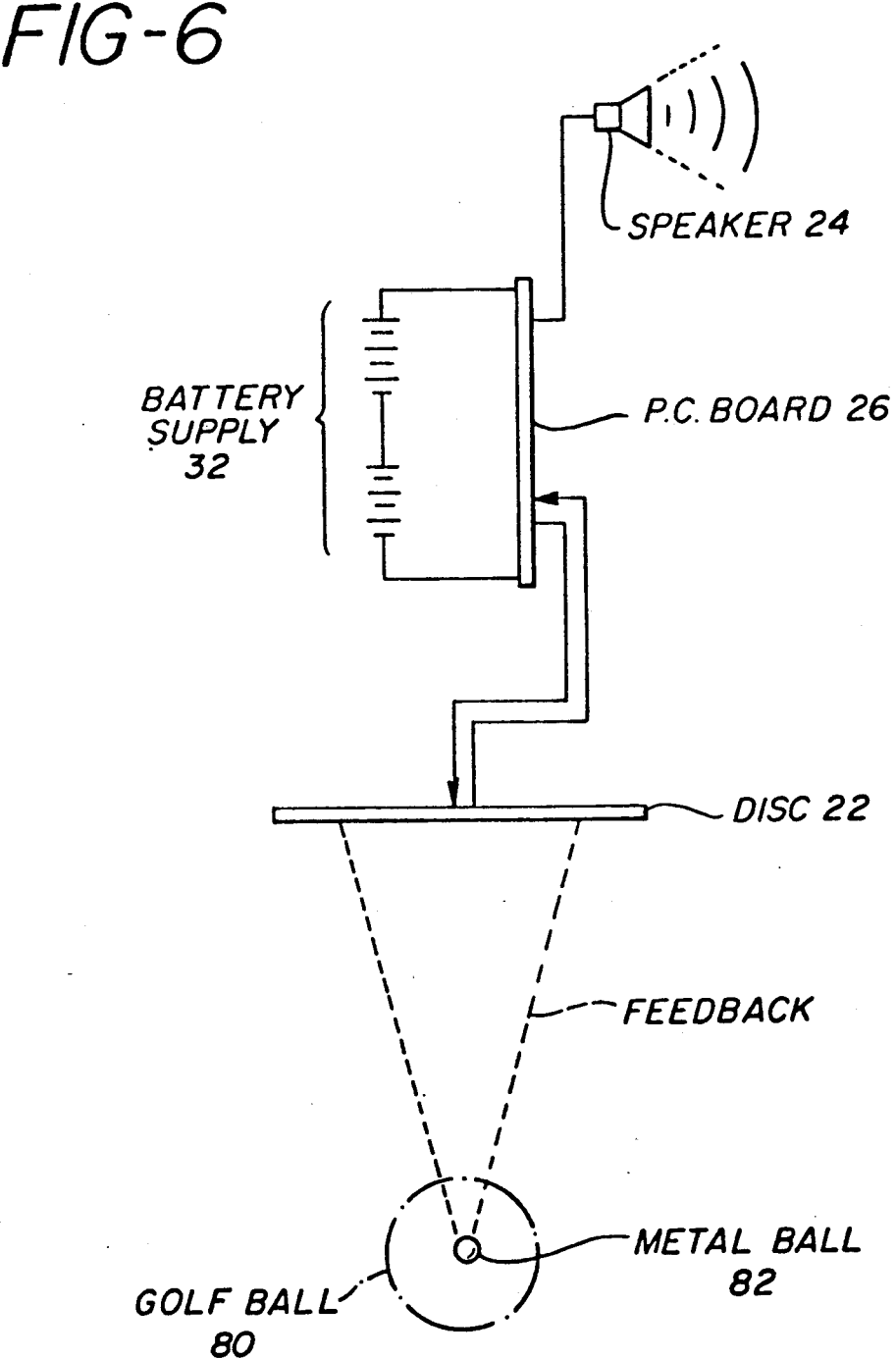
FIG. 6 is a schematic diagram of the metal detector assembly.

The golf ball finder carries a detection means in its lower end or head portion 21. Typically, the detection means comprises a metal detection apparatus. FIG. 6 presents a schematic diagram of the metal detection apparatus. Essentially, a PC board 26 operates a transmitter and receiver means located in disk 22. The metal detection device is powered by battery supply 32. Upon movement of the disk into the proximity of metal, an audible signal is emitted from speaker 24.

Generally, as seen in FIG. 1, the disk 22 forms the bottom surface of the head 20. The speaker 24 may be positioned in any convenient space. In the preferred embodiment, it is mounted on the shaft 12 near head 20. Also provided near the head 20 and within the shaft 12 is the battery supply 32 and PC board 26. In the preferred embodiment a cover 28 is provided to allow for easy access to the battery supply 32 and the PC board 26. While all the components of the detection system may be located anywhere within the golf ball finder 10, it is desirable to position the components in one area in the head portion 21 of golf ball finder 10 to minimize opportunities for possible submergence of the electrical components during retrieval of a golf ball submerged in water.

Extending from the head portion 21 to the handle portion 50 of the golf ball finder 10, is shaft portion 12. Shaft portion 12 is generally cylindrical in shape, and hollow in construction. In the preferred embodiment it is of a length such that overall length of the golf ball finder 10 is approximately 3 feet 9 inches.

The handle portion 50 of the golf ball finder 10 comprises a hand grip 52 typically made of rubber to provide a slip free gripping surface, and at the top of the handle, a removable cap 54. In the preferred embodiment, the cap 54 resembles the surface of a golf ball so that the golf ball finder 10 may be easily identified when placed with other golf clubs in a golf bag.

The cap 54 may be removed from the golf ball finder 10 by unscrewing it therefrom. Its removal permits access to a golf ball retriever apparatus, as shown FIG. 5. The golf ball retriever apparatus comprises a telescoping arm 56, one end of which is anchored within the shaft portion 12. When not in use, the arm 56 is collapsible and fits within the hollow shaft 12 of the golf ball binder 10. In use, the telescoping arm 56 is extendable from the golf ball finder 10—up to 9 feet in the preferred embodiment. While the construction of the telescoping portion of the retriever apparatus may be varied, generally the telescoping arm 56 is no greater than $\frac{1}{8}$ inch in diameter and comprises no more than three telescoping segments.

At its unanchored end, the retriever apparatus is provided with a retriever scoop 60, which comprises a circular frame 62 and a plurality of collapsible scoop basket members 64. When the retriever apparatus is not in use, and positioned within shaft 12, the collapsible scoop basket members 64 are rotated to the plane of the circular frame 62, and the scoop assembly fits within the handle portion 50 of the golf ball finder 10. In use, the scoop basket members 64 are rotated out from the circular frame 62 to form retriever scoop 60, the retriever scoop being sized to support and carry a golf ball. Alternatively, the retriever apparatus could comprise a pincer means for grabbing a golf ball, or a rake means for retrieving a golf ball.

The method for locating and retrieving a golf ball involves the use of the golf ball finder 10 in connection with a golf ball having a metallic or conductive element. In the preferred embodiment, shown in FIGS. 3 and 4, the golf ball 80 comprises a metal center 82, surrounded by a solid resilient inner material 84, encased in a hard outer plastic skin 86. Not only does the metal center 82 lend to the golf ball 80 an ability to be located with a metal detector, but also adds weight and stability to the golf ball in flight and results in a truer accuracy of the golf ball. It is important to note though the golf ball 80 having a metal center is preferred, the method of locating and retrieving a golf ball may also be used in connection with a golf ball having metallic or conductive elements disposed in or on any location of the golf ball.

In use, when a golfer looses a golf ball, the golfer goes to the general area where he or she thinks the golf ball is, removes the golf ball finder 10 from his or her golf bag, turns the detection unit on by means of switch 30 and proceeds to travel slowly across the general area while gently swinging the golf ball finder 10 from side to side, the disk 22 of the head 20 facing the ground and positioned a few inches above the ground.

When the detection unit comes into a close proximity with the golf ball, the speaker 24 emits an audible signal to alert the golfer of the find. This method for locating a golf ball works in all types of environments including heavy brush, leaves, and rough, and even works with golf balls submerged in water, or buried under sand.

After the location of the golf ball is determined, the golf ball must be retrieved. Retrieval can be effected manually if the golf ball is no in a particularly hazardous or awkward position. If, however, the golfer's access to the golf ball is blocked by some physical barrier such as heavy brush or water, the golfer may use the retrieval means to retrieve the golf ball. First, the golfer unscrews the cap 54 of golf ball finder 10, positions the scoop basket members to scooping position, and extends the telescoping retrieval shaft to a desired length. Then, the golfer extends the scoop basket to the golf ball and scoops up the golf ball, thereby completing retrieval. The retrieval apparatus of the golf ball finder allows the golfer to retrieve balls from a distance of up to approximately 9 feet from the golfer.

Optionally, the golfer may carry in his or her golf bag other items which may be used in connection with the golf ball finder. Such items may be attachable to the golf ball finder 10 by means of the threaded engagement means on the handle portion 50, which is accessible upon removal of the cap 54. An example of such and item is an umbrella having a specially adapted handle to threadably engage the threaded engagement means of the golf ball finder. Thus, one could be protected from rain or sun while finding a lost golf ball.

Having thus described my invention in detail, it is understood that the foregoing description is not intended to limit the spirit and scope thereof. What is desired to be protected by Letters Patent is set forth in the appended claims.

What is claimed is:

1. A method of locating a golf ball having a metal center comprising the steps of:
   holding an elongated finder retriever apparatus, with a finder end having a metal detector means therein, the finder end held remote from the user of the apparatus;
   moving the metal detector means in the finder end over an area to locate a golf ball;
   reversing the finder retriever apparatus to present the retrieving end of the finder retriever apparatus remote from the user of the apparatus;
   extending a telescoping apparatus to enlarge the length that the retrieving end extends from the user of the apparatus; and
   contacting and lifting the located golf ball with the retrieving end of the finder retriever apparatus.

2. The method of claim 1, further comprising, after the step of reversing the finder retriever apparatus, the step of extending collapsible scoop basket members from a circular scoop frame to form a scoop basket at the retrieving end of the apparatus.

3. A golf ball finder and retriever for locating and retrieving a golf ball having a metal center comprising:
   a head;
   a handle;
   a shaft interconnecting said head and said handle, said shaft being of a length and of a diameter similar to a golf club shaft;
   metal detection means disposed in said head for detecting the location of a golf ball having a metal center;
   signal means for notification of the detection of a golf ball having a metal center;
   a removable cap disposed on said handle; and
   retrieval means for retrieving the located golf ball, said retrieval means being disposed within said shaft and accessible upon the removal of said removable cap, said retrieval means comprising a telescoping arm anchored within said shaft, and extendible therefrom, and a scoop means mounted on the unanchored end of said telescoping arm.

4. The golf ball finder and retriever of claim 3 wherein said head is of a size similar to the head of a conventional golf club.

5. The golf ball finder and retriever of claim 4 wherein said head comprises a flat disk bottom having transmitting and receiving coils therein for detection of golf balls having metal centers.

6. The golf ball finder and retriever of claim 3 wherein said handle comprises a hand grip means for providing a non-slip gripping surface.

7. The golf ball finder and retriever of claim 6 wherein said hand grip means comprises a rubber strip extending the circumference of said handle.

8. The golf ball finder and retriever of claim 3 wherein said removable cap is threadably engageable with said handle and has the exterior shape of a half-sphere with a dimpled surface to provide for the easy recognition of said apparatus in a golf bag.

9. The golf ball finder and retriever of claim 3 wherein said scoop means comprises a circular frame and a plurality of scoop basket members, said scoop basket members being collapsible from a plane perpendicular to said circular frame for scooping, to a plane defined by the circular frame for storage of said retrieval means within said shaft.

10. The golf ball finder and retriever of claim 3 wherein said apparatus further comprises means for attachment of an umbrella for protection from sun and/or rain during the step of moving the metal detection means.

11. A combination golf ball having a metal center and a golf ball finder and retriever apparatus for locating lost golf balls having metal centers and retrieving the same, comprising:
    a head of a size similar to the head of a conventional golf club;
    a handle;
    a shaft interconnecting said head and said handle, said shaft being of a length and of a diameter similar to a golf club shaft;
    metal detection means disposed in said head for detecting the location of a golf ball having a metal center;
    signal means for notification of the detection of a golf ball having a metal center; and
    retrieval means for retrieving the located golf ball, said retrieval means being disposed within said shaft and accessible upon the removal of said removable cap, said retrieval means comprising a telescoping arm anchored within said shaft, and extendible therefrom, and a scoop means.

12. The golf ball finder and retriever of claim 14 wherein said head comprises a flat disk bottom having transmitting and receiving coils therein for detection of golf balls having metal centers.

13. The golf ball finder and retriever of claim 14 wherein said handle comprises a hand grip means for providing a non-slip gripping surface.

14. A golf ball finder and retriever of claim 13 wherein said hand grip means comprises a rubber strip extending the circumference of said handle.

15. The golf ball finder and retriever of claim 14 wherein said removable cap is threadably engageable with said handle and has an exterior shape of a half-sphere with the dimpled surface of a golf ball for easy recognition of said apparatus in a golf bag.

16. The golf ball finder and retriever of claim 14 wherein said scoop means comprises a circular frame and a plurality of scoop basket members, said scoop basket members being collapsible from a plane perpendicular to said circular frame for scooping, to a plane defined by the circular frame for storage of said retrieval means within said shaft.

17. The method of claim 14 wherein said apparatus further comprises means for attachment of an umbrella for protection of the golfer from sun and/or rain during the step of moving the metal detection means.

* * * * *